Sept. 21, 1965  R. N. BOWDEN  3,206,844
SEAL PULLER TOOL
Filed June 28, 1963
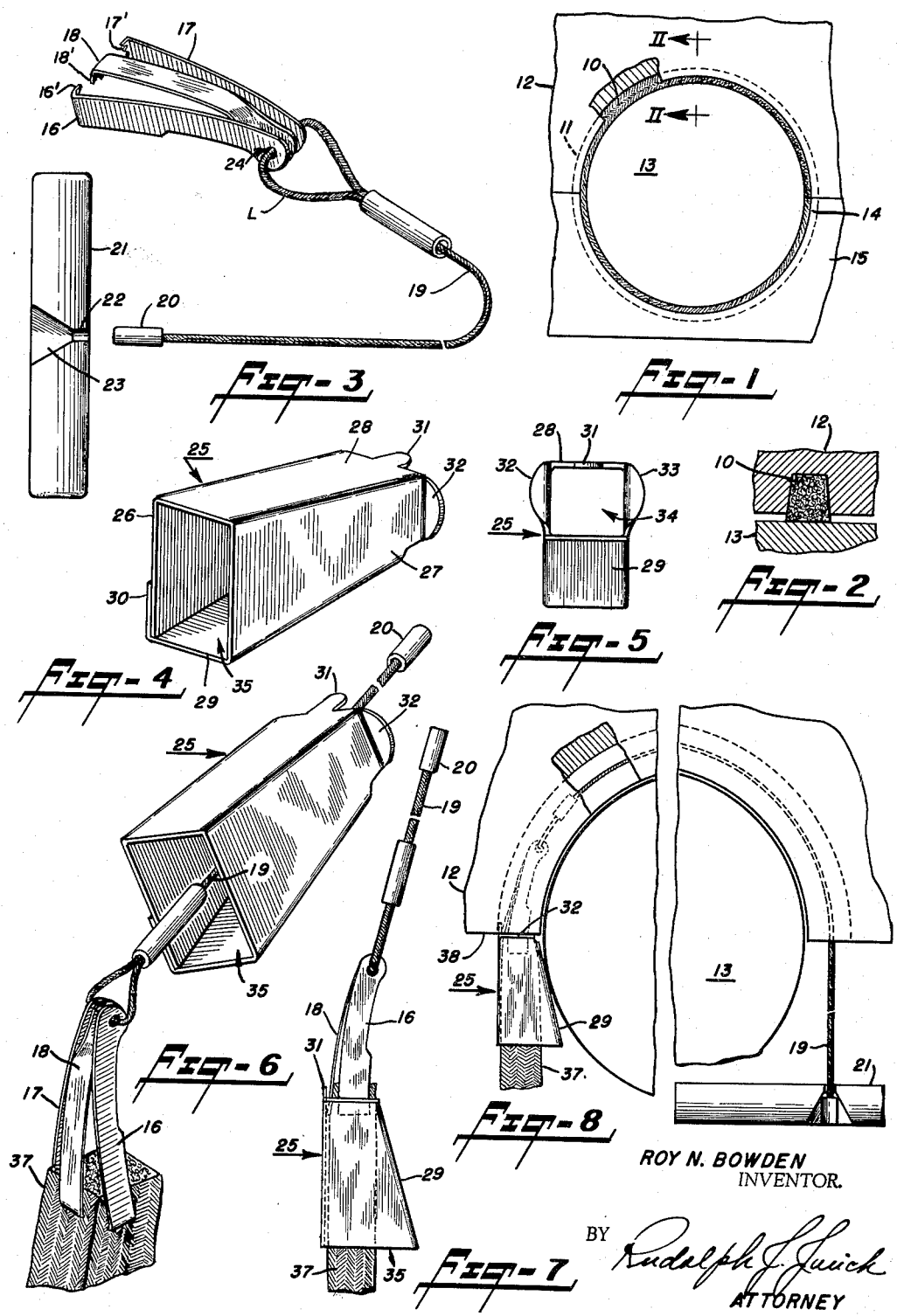
ROY N. BOWDEN
INVENTOR.
BY Rudolph J. Juick
ATTORNEY United States Patent Office 3,206,844
Patented Sept. 21, 1965

3,206,844
SEAL PULLER TOOL
Roy N. Bowden, 143 Washington St., Morristown, N.J.
Filed June 28, 1963, Ser. No. 291,390
2 Claims. (Cl. 29—278)

This invention relates to a novel tool to facilitate the replacement of the rear main bearing oil seal of an engine.

The replacement of the rear main bearing oil seal of an internal combustion engine presently is attended by considerable difficulty and aggravation. The job, of course, can be done by removing the crankcase and main bearing caps and lowering the crankshaft, but this is time consuming and costly. Obvious advantages obtain when the job can be performed without lowering the crankshaft relative to the engine block. Toward this end, it is the present practice to use a tool commonly known as a Chinese finger, which is a tubular basket made of woven wire having a flexible cable attached to one end. An end of the new oil seal is inserted into the end of the finger and an axial tension is applied thereto. This causes a simultaneous axial elongation and radial contraction of the finger thereby gripping the seal. The greater the tensive force applied to the finger, the greater the gripping force thereof against the seal. The flexible cable is inserted completely though the seal channel whereby an end thereof is available to pull the new seal into position.

The use of the Chinese finger necessitates the lowering of all main bearing caps and the simultaneous use of both hands. One hand pulling upon the cable and the other hand maintaining the gripping action of the finger on the seal as the forward end of the seal is guided into the channel. Once the seal enters the channel, brute force is required to pull the seal into final position. This often results in several complications. A new seal is pre-cut to proper size and, generally, is about one inch longer than the seal channel. Consequently, a portion of the finger still remains compressed within the seal channel after the seal has been pulled through the channel the required distance. Inasmuch as such portion of the finger is compressed between the seal and the channel walls, the removal of the finger is difficult. Generally, this requires considerable picking at the finger by means of a sharp-pointed tool and a simultaneous manipulation of the finger. An attempt to adjust the length of the seal end that initially is gripped by the finger, so that the finger will be free of the seal channel when the seal is properly inserted therethrough, results in an impositive gripping action, and, even in such case, the force required to pull the seal through the channel is such that often the seal inadvertently is pulled beyond the proper point. In either case, the operation must be repeated. Additionally, the Chinese fingers are expensive and have a short operating life. The wire frays so that after 4 or 5 use cycles, the device is no longer useful for the purpose.

The use of a seal puller tool, constructed and arranged as hereindescribed, requires only the removal of the crank case and the single bearing cap associated with the oil seal to be replaced. The tool comprises a plurality of seal-gripping fingers and a funnel-shaped clamping member for retaining the fingers in seal-gripping relation on an end of the new seal. Such clamping member serves to preform the end of the seal to the general size and shape of the seal channel and to guide the seal into the channel. The arrangement is such that the clamping member engages the engine block and slides over the seal, as the latter is pulled through the seal channel.

An object of this invention is the provision of a tool for use in the installation of a rear main bearing oil seal in an engine.

An object of this invention is the provision of a seal puller tool having cooperating members for gripping an end of a seal, clamping means slidably positionable over the said members for retaining the members in seal-gripping relation on the seal and a flexible cable for pulling the members and the seal through an arcuate seal channel, said clamping means being arranged for slidable removal from the said members as the seal enters the channel and the said members being arranged for automatic disengagement with the seal after they pass through the channel.

An object of this invention is the provision of a tool for use in pulling a generally rectangular oil seal into position within an arcuate channel, said tool having separate seal-gripping members for positive attachment to an end of the seal for the purpose of pulling the seal through the channel, and a generally funnel-shaped clamping member slidably positionable over the seal-gripping members, said clamping member being arranged to retain the seal-gripping members attached to the seal as the seal is pulled into the channel, to preform the seal to the general size and shape of the channel, to guide the end of the seal into the channel and to become disengaged from the seal-gripping members as they enter into the channel.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a fragmentary representation showing the rear main bearing oil seal of an internal combustion engine;

FIGURE 2 is an enlarged cross-sectional view taken along the line II—II of FIGURE 1;

FIGURE 3 is a view of the seal puller tool made in accordance with this invention;

FIGURE 4 is an isometric view of the clamping member, drawn to an enlarged scale;

FIGURE 5 is a front view of the clamping member;

FIGURE 6 is a fragmentary, isometric view showing the first step in attaching the tool to an end of a seal;

FIGURE 7 is a similar view but showing the clamping member slidably positioned over the seal-gripping members; and FIGURE 8 shows the seal about to be pulled into position within the seal channel.

Reference, now, is made to FIGURES 1 and 2 wherein the upper, rear main bearing oil seal 10 is shown disposed within an arcuate seal channel 11, formed in the cylinder block 12, and in surface engagement with the crankshaft 13. The complementary lower seal 14 is carried within a bearing cap 15. These seals are made of woven asbestos, are tightly compacted within their respective channels and serve to prevent oil from escaping onto the clutch.

The bearing cap 15 readily is removable and the replacement of the lower seal 14 presents no particular problem as this operation can be performed on a work bench. Replacement of the upper seal 10 is difficult and time consuming. The job presently is done by removing the front and rear main bearing caps, lowering the crankshaft and pulling the new seal into position by means of the Chinese finger. This involves several hours of labor by a skilled mechanic. It will be apparent, however, that a means for installing a new upper seal with the crankshaft in situ would reduce, considerably, the overall time required for this particular job. The tool now to be described serves this purpose.

FIGURE 3 illustrates the new tool, which comprises three hardened tool steel members 16, 17 and 18 loosely secured together by a flexible cable 19 having a loop L passing through aligned holes formed in the proximate ends of the individual members, such as the hole 24 of the member 16 visible in this view. The outer members 16 and 17 are provided with inwardly-directed tooth portions 16', 17', respectively, for gripping an end of the oil seal, and have arcuate side edges. The center member 18 has a slightly arcuate body portion and is twisted such that the lower end is parallel to the proximate ends of the other two members while the free end portion lies in a plane substantially normal to that of the tooth portions 16', 17'. The free end of the member 18 is offset downwardly and formed into a tooth portion 18' thereby providing an additional grip upon the seal when the tool is in use.

In FIGURE 3, the tool is drawn to a scale approximately twice the actual size, whereas FIGURES 1 and 2 are drawn to a much smaller scale than actual size. The seal-gripping members 16, 17 and 18 have arcuate body portions conforming generally to the mean radius of the seal channel 11 shown in FIGURE 1, whereby the members can be pulled through the channel by means of the attached cable without binding or jamming. The cable is formed of stranded steel wires and, although it is flexible, it is sufficiently rigid so that the free end, having the metal plug 20 secured thereto, can readily be slipped through the seal channel after the old seal has been removed. A handle 21 is provided for removable attachment to the cable end to facilitate pulling the new seal into position. Such handle is provided with a transverse slot 22 communicating with a tapered bore 23 for receiving the cable plug 20 when the handle is attached to the cable.

Reference, now, is made to FIGURES 4 and 5 which show a clamping member 25 preferably made of steel. Such member may be punched from flat stock and bent along longitudinal lines to form the side walls 26, 27, top wall 28 and bottom wall 29. An overlapping portion 30 is welded to the side wall 26 thereby forming a rigid structure. The top wall 28 includes an integral tab 31 lying on the plane of the wall and the side walls include integral ears 32, 33 which are bent to lie in a plane substantially normal to the side walls. The front opening 34 of the clamping member (see FIGURE 5) corresponds substantially in size and shape to the cross-sectional configuration of the entrance opening of the seal channel which opening obviously corresponds to the cross-sectional configuration of the seal 10 shown in FIGURE 2. On the other hand, the rear opening 35, of the clamping member (see FIGURE 4), corresponds, in shape, to the new seal but is of greater size so that a new seal will readily pass therethrough. It is here pointed out that the tab 31 is designed to enter into the seal channel when the bottom wall of the clamping member rests against the crankshaft and the lateral ears 32 and 33 abut against the wall of the cylinder block.

The first step in attaching the tool to an end of a new seal is shown in FIGURE 6. It will be noted that the tooth portions of the seal-gripping members 16 and 17 are embedded in opposing sides of the seal 37 and that the center seal-gripping member 18 overlies the top surface of the seal with its tooth portion embedded therein. All tooth portions of the separate seal-gripping members are embedded in the seal at points well spaced from the seal end. This is an important practical consideration since the seal is made of woven asbestos and has a cross-sectional area substantially greater than that of the seal channel. Consequently, a relatively large force is required to pull the seal through the channel. If the tooth portions of the seal-gripping members bite into the seal at points close to the seal end, such portions may rip through the seal material, in an axial direction, as the seal end is being forcefully pulled into the channel.

With one hand, the operator holds the seal-gripping members in the positions shown in FIGURE 6 and with the other hand he slides the clamping member into the position shown in FIGURE 7. The enlarged opening 35, of the funnel-shaped clamping member, facilitates the forceful sliding of the clamping member to the illustrated position. The reduced opening in the other end of the clamping member now compresses the seal into a shape corresponding to that of the channel entrance opening. The tool is now securely attached to the seal with the tooth portions of the seal-gripping members firmly embedded therein. This is another important feature of the invention, since it permits the attachment of the tool to the seal at any convenient location removed from the engine and the free end of the cable, carrying the plug 20, can be inserted through the seal channel without fear of the tool and seal becoming separated.

After the plug-carrying end of the cable has been passed through the seal channel, the handle 21 is attached thereto, as shown in FIGURE 8. As the cable is pulled through the channel, the operator orients the clamping member 25 so that the bottom, tapered surface 29 rests against the crankshaft 13 and the tab 31 enters into the channel entrance opening. At this point, the two offset ears of the clamping member abut against the wall 38 of the engine block 12, only the one ear 32 being visible in the view of FIGURE 8. The clamping member is held in this position by a small pulling force applied to the cable 19. Now, both hands may be utilized to apply the force required to pull the seal through the channel. Inasmuch as the clamping member is not secured in fixed position to the engine block, such member effectively is self-adjusting relative to the seal channel and crankshaft, thereby to properly guide the seal into the channel opening.

As the seal is pulled through the channel, the tooth portions of the seal-gripping members pass out of the clamping member and into the channel. As long as the seal-gripping members are positioned within the channel, the compressive force of the seal, exerted against the channel walls, retains the tooth portions embedded in the seal. Now, when the seal-gripping members emerge from the other end of the channel, they are no longer restrained against lateral movement and the protruding portion of the seal is no longer retained in a state of compression. These factors, plus the fact that the separate seal-gripping members are pivotally attached to the cable loop, result in an immediate and positive disengagement of the seal-gripping members from the seal. This constitutes another important feature of the invention, since the described automatic disengagement of the tool from the seal makes it impossible to pull the seal an excessive extent through the channel. Normally, a particularly seal is designed for installation in a given seal channel and has a length approximately one inch longer than the channel. By affixing the tooth portions of the seal-gripping members to seal at points approximately one half inch from the seal end, substantially equal lengths of the installed seal will protrude from each end of the channel. Such seal ends are then compacted into the channel by means of a suitable tool, an operation which is common in this art regardless of the particular method used for installing the new seal.

It will be apparent that the funnel-shaped clamping member serves several functions. It serves as a means for initially retaining the seal-gripping members attached to the seal. Further, the clamping member serves to compress the seal, as it passes out of the clamping member, into a configuration corresponding substantially to that of the channel, and to guide the end of the seal into the entrance opening of the channel.

By making the body portions of the seal-gripping members of arcuate shape, such members can have a desirable axial length and yet be adapted for sliding movement through arcuate channels having radii falling within a practical range. At the same time, the relatively longer axial length permits affixing the tooth portions of the seal-gripping members at points spaced approximately one-half inch from the seal end, thereby reducing to a minimum the possibility of such tooth portions ripping through the seal material. Toward this same end, the three seal-gripping members preferably have different axial lengths so that the tooth portions thereof lie in different planes. In such case, the tooth portions will bite into the seal along three, spaced planes taken normal of the seal axis.

Having now described my invention, those skilled in this art will be able to make various changes and modifications to adapt the tool to specific cases. It is intended that such changes and modifications shall fall within the scope and spirit of the invention as recited in the following claims.

I claim:

1. In a tool for pulling an oil seal of generally rectangular cross-section through an arcuate channel presenting a rectangular opening of reduced cross-section, said tool being of the class comprising a plurality of seal-gripping members secured to a flexible cable and a tubular clamping member slidably positionable over the seal-gripping members to attach said seal-gripping members to the seal; the improvement wherein the said clamping member is of generally funnel shape and of rectangular cross-section throughout its length, the small end of said clamping member having an internal cross-sectional area corresponding to that of the said entrance opening.

2. The invention as recited in claim 1, wherein said clamping member includes laterally-offset ears extending outwardly from opposed side walls at the said small end thereof, and a tab extending longitudinally from another wall and beyond the plane of said ears.

References Cited by the Examiner

UNITED STATES PATENTS

| | | | |
|---|---|---|---|
| 963,965 | 7/10 | Weber | 15—104.3 |
| 1,108,025 | 8/14 | Thies | 254—134.3 |
| 2,242,533 | 5/41 | Mieghan | 29—241 X |
| 2,246,056 | 6/41 | McKenzie | 15—104.3 |
| 2,591,925 | 4/52 | Erbe | 29—241 X |

References Cited by the Applicant

UNITED STATES PATENTS

| | | |
|---|---|---|
| 1,392,339 | 10/21 | Kelly. |
| 1,620,928 | 3/27 | Walaschek. |

WILLIAM FELDMAN, *Primary Examiner.*

MYRON C. KRUSE, *Examiner.*